US012591951B2

(12) United States Patent
Liu et al.

(10) Patent No.: US 12,591,951 B2
(45) Date of Patent: Mar. 31, 2026

(54) SINGLE IMAGE SUPER-RESOLUTION PROCESSING METHOD AND SYSTEM

(71) Applicant: MONTAGE LZ TECHNOLOGIES (CHENGDU) CO., LTD., Chengdu (CN)

(72) Inventors: Chengqiang Liu, Chengdu (CN); Zhimin Qiu, Chengdu (CN); ChiaChen Chang, Chengdu (CN)

(73) Assignee: MONTAGE LZ TECHNOLOGIES (Chengdu) Co., Ltd., Chengdu (CN)

( * ) Notice: Subject to any disclaimer, the term of this patent is extended or adjusted under 35 U.S.C. 154(b) by 291 days.

(21) Appl. No.: 18/533,348

(22) Filed: Dec. 8, 2023

(65) Prior Publication Data

US 2024/0221114 A1 Jul. 4, 2024

(30) Foreign Application Priority Data

Dec. 28, 2022 (CN) .......................... 202211701116.9

(51) Int. Cl.
　　*G06T 3/4053* (2024.01)
　　*G06T 3/4007* (2024.01)
　　*G06T 3/60* (2024.01)
(52) U.S. Cl.
　　CPC .......... *G06T 3/4053* (2013.01); *G06T 3/4007* (2013.01); *G06T 3/60* (2013.01)
(58) Field of Classification Search
　　CPC ....... G06T 3/4053; G06T 3/4007; G06T 3/60; G06T 3/40; G06T 3/4046; G06N 3/08
　　See application file for complete search history.

(56) References Cited

U.S. PATENT DOCUMENTS

| | | | |
|---|---|---|---|
| 11,308,582 B2 | 4/2022 | Chou et al. | |
| 11,354,577 B2* | 6/2022 | Ren ........................ | G06N 3/045 |
| 2009/0028465 A1* | 1/2009 | Pan ....................... | G06T 3/4007 |
| | | | 382/300 |
| 2010/0119176 A1* | 5/2010 | Ichihashi ................ | G06T 3/403 |
| | | | 382/300 |
| 2015/0363910 A1* | 12/2015 | Sun .......................... | G06T 7/13 |
| | | | 382/300 |
| 2016/0225125 A1* | 8/2016 | Zhang ................... | G06T 3/4007 |

(Continued)

OTHER PUBLICATIONS

Okuhata et al. Implementation of Super-Resolution Scaler for Full HD and 4K Video, IEEE. (Year: 2013).*

(Continued)

*Primary Examiner* — John B Strege
(74) *Attorney, Agent, or Firm* — OLIFF PLC

(57) ABSTRACT

The present application relates to the technical field of image processing and discloses a single image super-resolution processing method and system. The method includes: inputting an image to be processed and performing edge direction-based upsampling on the image to obtain a target resolution image; inputting the target resolution image obtained by upsampling into one or more lookup tables to obtain a residual image, wherein the one or more lookup tables hold residual image information; and adding the target resolution image obtained by the upsampling to the residual image to obtain a super-resolution image. This application aims to improve image jaggedness, enhance image definition, and thus improve image quality without increasing too much hardware resources.

17 Claims, 4 Drawing Sheets

(56)            References Cited

U.S. PATENT DOCUMENTS

| | | | |
|---|---|---|---|
| 2021/0112261 A1* | 4/2021 | Hwang | ..................... G06T 7/90 |
| 2022/0245764 A1* | 8/2022 | Zhang | ..................... G06N 3/09 |

OTHER PUBLICATIONS

Chen et al, Single Depth Image Super-Resolution Using Convolutional Neural Networks, IEEE. (Year: 2018).*

Tai et al. Super Resoultion using Edge Prior and Single Image Detail Synthesis, IEEE (Year: 2010).*

Shen et al. GPU-Aided Real-time Image/Video Super Resolution Based on Error Feedback, IEEE (Year: 2014).*

Oh et al. Deep Video Super-Resolution Network Using Dynamic Upsampling Filters Without Explicit Motion Compensation, IEEE (Year: 2018).*

Jo et al., "Practical Single-Image Super-Resolution Using Look-Up Table," IEEE Xplore, Yonsei University, 2021, pp. 691-700.

* cited by examiner

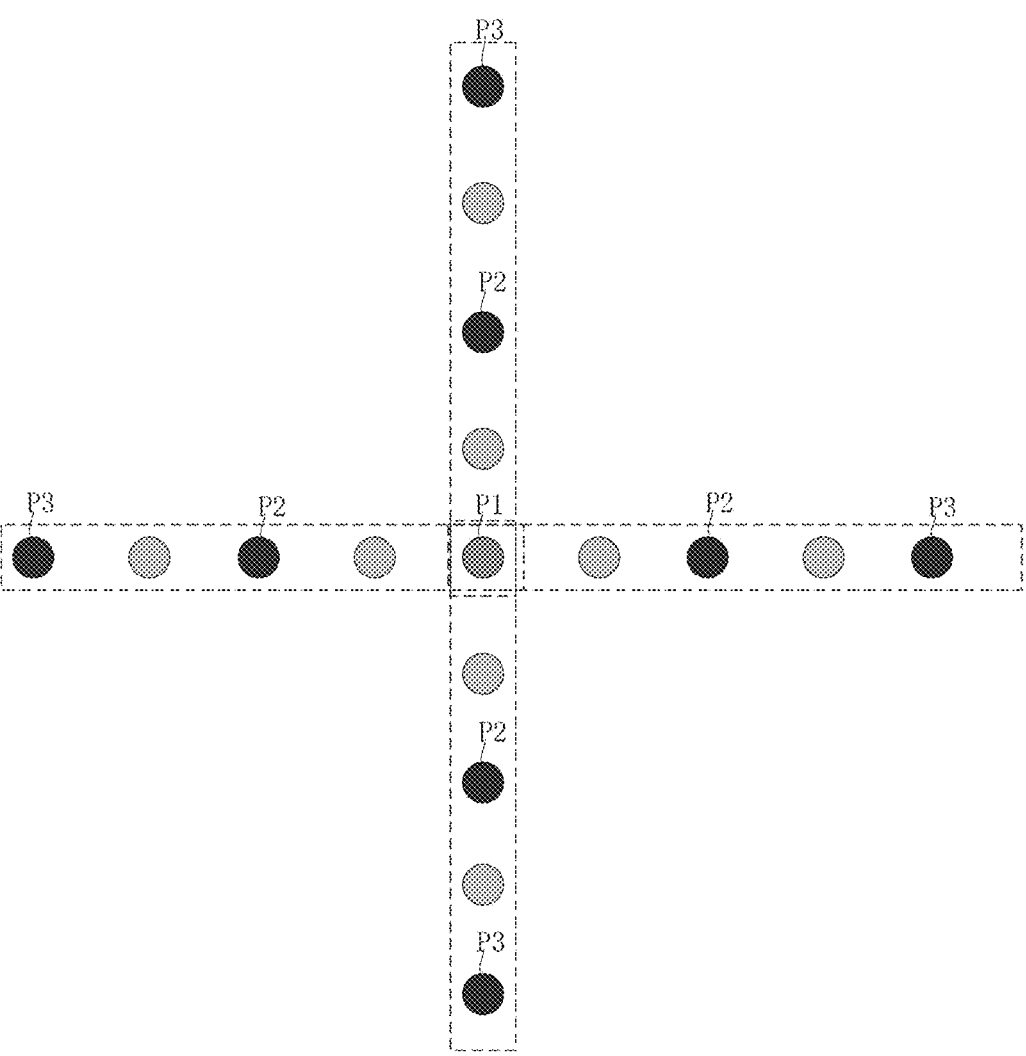
Figure 5(b)
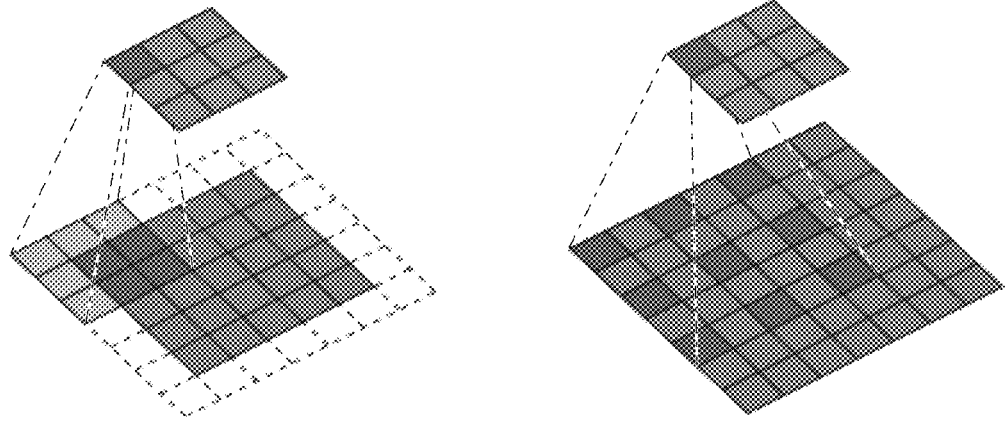
Figure 6(a)                               Figure 6(b)

SINGLE IMAGE SUPER-RESOLUTION PROCESSING METHOD AND SYSTEM

REFERENCE TO RELATED APPLICATION

This application claims priority to Chinese Application number CN202211701116.9, filed on Dec. 28, 2022, the contents of which are incorporated herein by reference.

TECHNICAL FIELD

This application relates to the technical field of image processing, in particular to a single image super-resolution (SISR) processing method and system.

BACKGROUND

With the development of display technology, there are many display devices that can support direct display of video images with a resolution of 4K or above. However, there is still a shortage of video sources of 4K or above, and there are also a large number of low-resolution (such as 720×576 or 720×480 resolution) video sources. These low-resolution video sources need to be upsampled and amplified before they can be displayed on these high-resolution display devices. At this point, since the magnification factor is usually very large, the upsampling process tends to cause jaggies and the output image is also not high in definition. This requires super-resolution processing technology to improve image definition and eliminate jaggies. The image super-resolution processing is the process of restoring high-resolution (HR) images from low-resolution (LR) images.

The popular image upsampling and amplification method (for example, Bicubic interpolation or Lanczos interpolation) is prone to produce large jaggies and low image definition when the magnification factor is large, but this processing method is simple and the hardware cost is low. Later, some single image super-resolution amplification methods based on image edge direction appeared, which greatly improve the quality of the amplified image and can improve negative effects such as image jaggedness. However, compared to the original image, the image definition is still relatively low, these methods are more complex, and the cost of hardware is slightly larger.

Recently, neural network-based methods have become popular in image super-resolution processing. The application of neural network-based methods in super-resolution processing greatly improves the image quality, image definition and image jaggedness. However, the hardware resources required by these current neural network-based methods are very large, making the hardware cost of implementing neural network-based super-resolution image processing on a chip very high and difficult to implement on a chip.

SUMMARY OF THE INVENTION

The purpose of this application is to provide a single image super-resolution processing method and system that improves image jaggedness, enhances image definition, and thereby improves image quality without increasing too much hardware resources.

The application discloses a single image super-resolution processing method, the method comprises:

inputting an image to be processed and performing edge direction-based upsampling on the image to obtain a target resolution image;

inputting the target resolution image obtained by upsampling into one or more lookup tables to obtain a residual image, wherein the one or more lookup tables hold residual image residual image information; and adding the target resolution image obtained by the upsampling to the residual image to obtain a super-resolution image.

In one embodiment, the one or more lookup tables are obtained by using a training process.

In one embodiment, the training process comprises a training process that combines a convolutional neural network with an edge direction-based upsampling method.

In one embodiment, using the training process that combines the convolutional neural network with the edge direction-based upsampling method to obtain the one or more lookup tables, comprises:

applying the edge direction-based upsampling to low-resolution training images in a training dataset to obtain target resolution training images;

inputting original high-resolution training images corresponding to the low-resolution training images in the training dataset and the target resolution training images obtained by upsampling into one or more convolutional neural network models for training, wherein the resolution of the original high-resolution training images is the same as that of the target resolution training images obtained by upsampling; and converting the trained one or more convolutional neural network models into corresponding one or more lookup tables.

In one embodiment, input layers of the one or more convolutional neural network models use dilated convolution, the method further comprises:

determining an amplification factor of the edge direction-based upsampling to obtain the target resolution training images, and determining a dilation rate of the dilated convolution based on the amplification factor;

training with one or more convolutional neural network models with different dilation rates of the dilated convolution; and weighting training results of the one or more convolutional neural network models with different dilation rates of the dilated convolution.

In one embodiment, the dilation rate of the dilated convolution is calculated according to the following formula: $d=INT(R*a)$, wherein d is the dilation rate of the dilated convolution, R is the magnification factor, a is an adjustment coefficient, and INT (.) is a rounded down function.

In one embodiment, after weighting the training results of the one or more convolutional neural network models with different dilation rates of the dilated convolution, the method further comprises:

weighting and summing the training results of the one or more convolutional neural network models with different dilation rates of the dilated convolution to obtain residual training images, and adding the residual training images to the target resolution images obtained by edge direction-based upsampling to obtain super-resolution training images;

calculating a mean square error between the super-resolution training images and the original high-resolution training images; and passing the mean square error through a backward propagation network, and optimizing and updating weights of the one or more convolutional neural network models by using a preset algorithm.

In one embodiment, for a lookup table generated by training a convolutional neural network model using a dilated convolution with a dilation rate of 1, selecting n pixels at an interval of 0 from the target resolution image obtained by upsampling as input data put into the lookup table, and for a lookup table generated by training a convolutional neural network model using a dilated convolution with a dilation rate of 2, selecting n pixels at an interval of 1 from the target resolution image obtained by upsampling as input data put into the lookup table.

In one embodiment, the method further comprises:

obtaining a set of training images by rotating the target resolution training image obtained by upsampling at different angles; and training on the set of training images obtained by rotating at different angles by employing one or more convolutional neural network models of dilated convolution with different dilation rate combinations.

In one embodiment, the different angles of rotation include 0°, 90°, 180°, and 270°, wherein the training images obtained from 0° and 180° rotations are trained by employing one or more convolutional neural network models with more dilation rate combinations than the training images obtained from 90° and 270° rotations.

In one embodiment, for a lookup table generated by performing convolutional neural network model training on training images obtained by rotating at different angles, selecting n pixels at corresponding rotation from the target resolution image obtained by upsampling angle as input data into the lookup table.

In one embodiment, the method further comprises:

during the process of converting the trained one or more convolutional neural network models into one or more lookup tables, downsampling the converted one or more lookup tables to reduce the size of the lookup tables.

In one embodiment, the step of inputting the target resolution image obtained by upsampling into one or more lookup tables to obtain a residual image, comprises:

during the process of inputting the target resolution image obtained by upsampling into one or more lookup tables to obtain the residual image, performing upsampling interpolation on the one or more lookup tables.

In one embodiment, an interval of the downsampling is 8, 16, or 32.

In one embodiment, the interpolation includes 3D linear interpolation and tetrahedral interpolation.

The application also discloses a single image super-resolution processing system, the system comprises:

an upsampling module configured to perform edge direction-based upsample on an input image to be processed on to obtain a target resolution image;

a residual image generation module configured to input the target resolution image obtained by upsampling into one or more lookup tables to obtain a residual image, wherein the one or more lookup tables hold residual image information; and an addition module configured to add the target resolution image obtained by upsampling to the residual image to obtain a super-resolution image.

The present application also discloses a computer-readable storage medium in which computer-executable instructions are stored, the computer-executable instructions being executed by a processor to implement the steps in the method as previously described.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

BRIEF DESCRIPTION OF THE FIGURES

FIG. 5(*b*) is a schematic diagram of a process for selecting input data when the dilation rate is 2 according to an embodiment of the present application.

FIG. 6(*a*) is a schematic diagram of the dilated convolution with the dilation rate of 1 according to an embodiment of the present application.

FIG. 6(*b*) is a schematic diagram of the dilated convolution with the dilation rate of 2 according to an embodiment of the present application.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application more clear, embodiments of the present application will be further described in detail below with reference to the accompanying drawings.

Figures 1, 2:
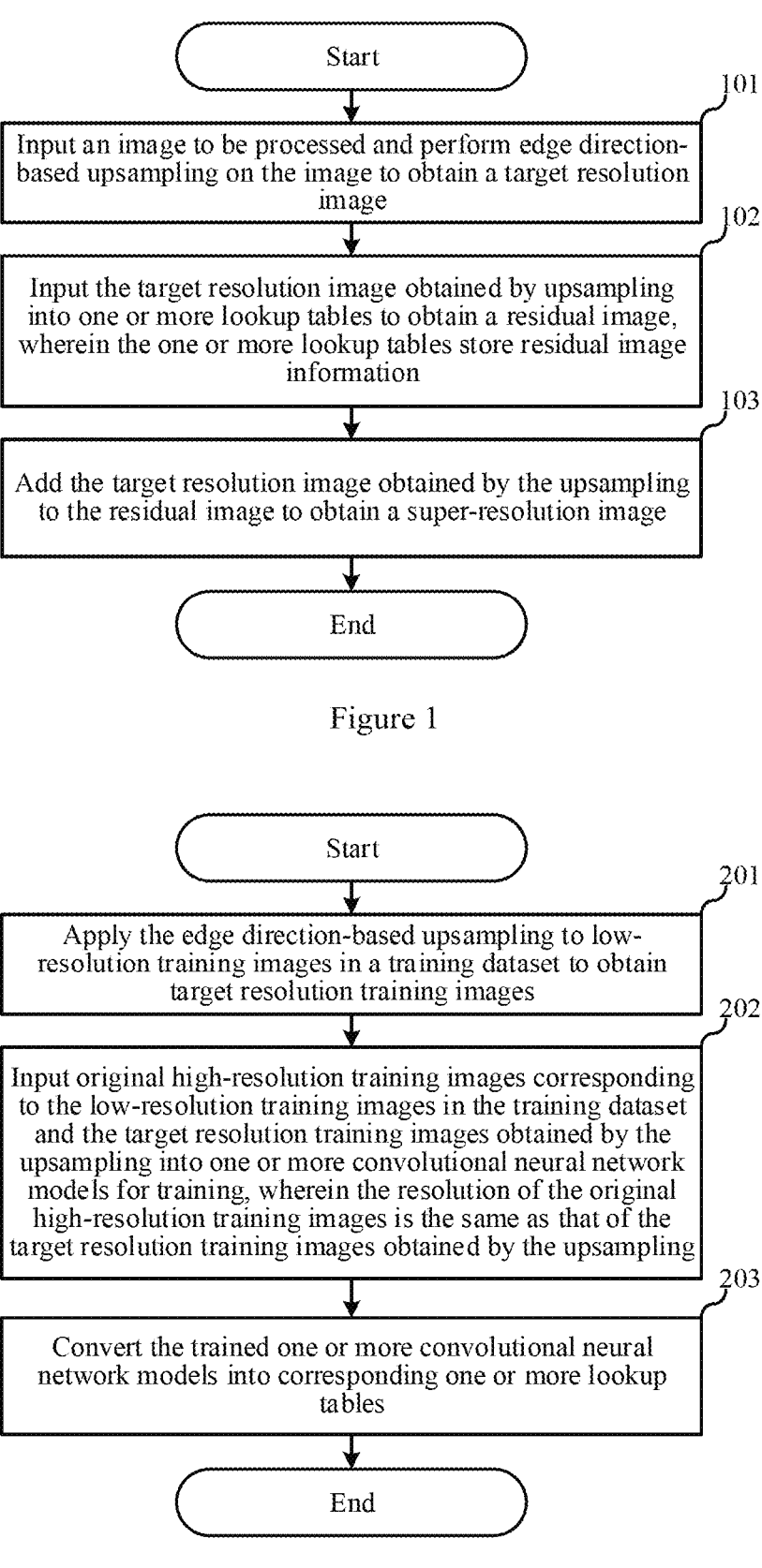
FIG. 1 is a flow diagram of a single image super-resolution processing method according to a first embodiment of the present application.
FIG. 2 is a flow diagram of applying a training process that combines the convolutional neural network with the edge direction-based upsampling method to obtain one or more lookup tables according to an embodiment of the present application.

A first embodiment of the present application relates to a single image super-resolution processing method, the flow of which is shown in FIG. 1, the method comprises the following steps:

Step 101, inputting an image to be processed and performing edge direction-based upsampling on the image to obtain a target resolution image.

Step 102, inputting the target resolution image obtained by upsampling into one or more lookup tables (LUTs) to obtain a residual image, wherein the one or more lookup tables store residual image information. In one embodiment, the number of the lookup tables may be 4, 6, or 8.

Step 103, adding the target resolution image obtained by upsampling to the residual image to obtain a super-resolution image.

In one embodiment, the one or more lookup tables are obtained by using a training process. In one embodiment, the training process is implemented by using a convolutional neural network combined with an edge direction-based upsampling.

In one embodiment, using the training process to obtain the one or more lookup tables, comprises the following steps:

Step 201, applying the edge direction-based upsampling to low-resolution training images in a training dataset to obtain target resolution training images.

Step 202, inputting original high-resolution training images corresponding to the low-resolution training images in the training dataset and the target resolution training images obtained by upsampling into one or more convolutional neural network models for training, wherein resolution of the original high-resolution training images is the same as that of the target resolution training images obtained by upsampling.

Step 203, converting the trained one or more convolutional neural network models into corresponding one or more lookup tables. The converted one or more lookup tables are stored in a storage unit that executes a single image super-resolution processing method to be called to obtain the residual image information.

In one embodiment, input layer(s) of the one or more convolutional neural network models uses dilated convolution, the step 201 further determines an amplification factor of the edge direction-based upsampling to obtain the target resolution training images, and determines a dilation rate of the dilated convolution based on the amplification factor. In one embodiment, the dilation rate of the dilated convolution is calculated according to the following formula: d=INT (R*a), wherein d is the dilation rate of the dilated convolution, R is the magnification factor, a is an adjustment coefficient, and INT (.) is a round down function. At step 202, one or more convolutional neural network models with different dilation rates of the dilated convolution are trained. And, training results of the one or more convolutional neural network models with different dilation rates of the dilated convolution are weighted. For example, when the magnification factor is 2, the dilation rates of the dilated convolution are taken as 1 and 2, respectively. That is to say, the convolutional neural network models with dilation rates of 1 and 2 are used for training, and the training results are weighted.

In one embodiment, after the training results of the one or more convolutional neural network models with different dilation rates of the dilated convolution are weighted, the training results of the one or more convolutional neural network models with different dilation rates of the dilated convolution are weighted and summed to obtain residual training images, then the residual training images are added to the target resolution training images obtained by upsampling to obtain super-resolution training images, a mean square error between the super-resolution training images and the original high-resolution training images is calculated, and the mean square error is passed through a back-propagation network and the weights of the one or more convolutional neural network models is optimized and updated by using a preset algorithm.

In one embodiment, for a lookup table generated by training a convolutional neural network model using a dilated convolution with a dilation rate of 1, n pixels are selected at an interval of 0 from the target resolution image obtained by the upsampling as input data put into the lookup table. For a lookup table generated by training a convolutional neural network model using a dilated convolution with a dilation rate of 2, n pixels are selected at an interval of 1 from the target resolution image obtained by the upsampling as input data put into the lookup table. It should be noted that for a 3D lookup table, three pixels are selected as input data and for a 4D lookup table, four pixels are selected as input data.

In one embodiment, at step 201, a set of training images are obtained by rotating the target resolution training image obtained by the upsampling at different angles. At step 202, the set of training images obtained by rotating at different angles are trained by employing one or more convolutional neural network models of dilated convolutions with different dilation rate combinations. In one embodiment, the different angles of rotation include 0°, 90°, 180°, and 270°, wherein the training images obtained from 0° and 180° rotations are trained by employing one or more convolutional neural network models with more dilation rate combinations than the training images obtained from 90° and 270° rotations.

In one embodiment, for a lookup table generated by performing convolutional neural network model training on training images obtained by rotating at different angles, n pixels are selected at corresponding rotation angles from the target resolution image obtained by the upsampling as input data put into the lookup table.

In one embodiment, at step 203, during the process of converting the trained one or more convolutional neural network models into corresponding one or more lookup tables, the converted one or more lookup tables are down-sampled to reduce the size of the lookup tables. In one embodiment, the interval of the downsampling is 8, 16, or 32. It should be understood that the step of downsampling the converted one or more lookup tables is optional, and in other embodiments of the present application, downsampling may not be performed.

In one embodiment, at step 102, during the process of inputting the target resolution image obtained by upsampling into one or more lookup tables to obtain the residual image, upsampling interpolation is performed on the one or more lookup tables. In one embodiment, the interpolation includes 3D linear interpolation, tetrahedral interpolation.

The application adopts a method combining the edge direction-based super-resolution processing technology with LUTs, the high-resolution output of the method not only achieves the feature of fewer jaggies in the output image-based on upsampling interpolation in the edge direction, but also greatly improves the image definition. This greatly improves the output image quality without increasing too much hardware resources.

In order to better understand the technical solutions of this specification, the following description will be given with a specific embodiment. The details listed in this embodiment are mainly for ease of understanding and are not intended to limit the scope of protection of this application.

Figure 3:
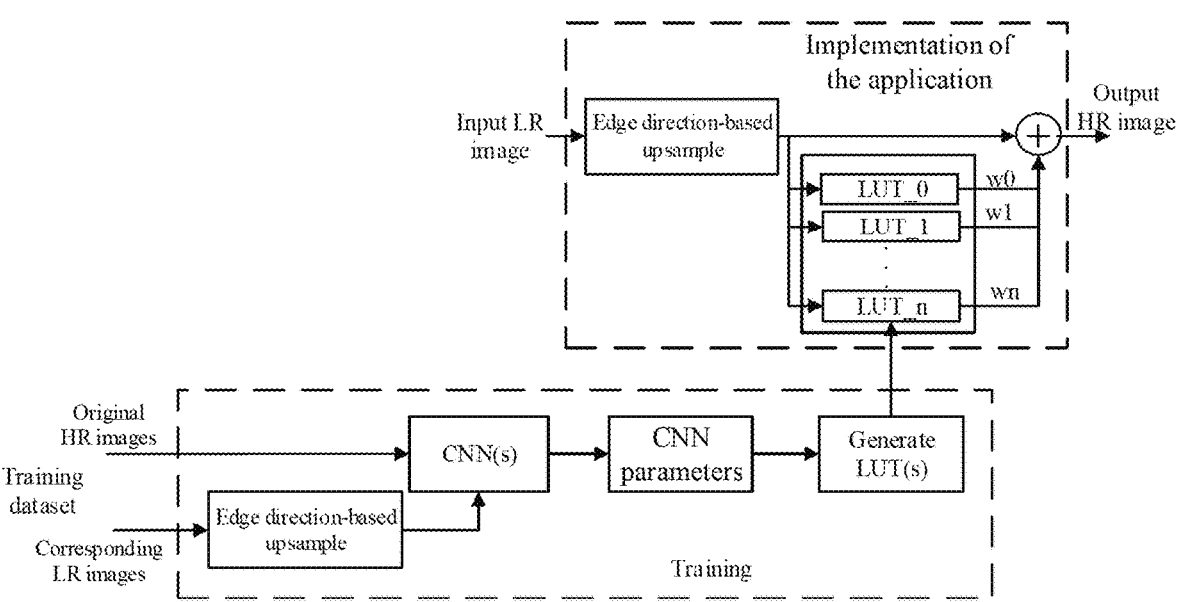
FIG. 3 is a schematic block diagram of a single image super-resolution processing method according to an embodiment of the present application.

FIG. 3 is a general block diagram according to one embodiment of the present application. The present application adopts a method combining the edge direction-based super-resolution processing technology with LUTs.

Firstly, edge direction-based upsampling is performed on the input image, and upsampled results are input into n LUTs generated by training (wherein the number of n is 4, 6, or 8) to obtain residual data. Then, the residual data is added to the image obtained by the edge direction-based upsampling to obtain the final high-resolution image output. The edge direction-based upsampling may be any upsampling amplification method based on the edge direction.

The content stored in the LUTs is residual information of the edges related to the input current pixel and its surrounding pixels, which is obtained through training on a large number of video and image datasets. One of the methods for obtaining the LUTs is to combine a convolutional neural network with the edge direction-based upsampling approach.

Specifically, during the process of using convolutional neural networks to train and generate the LUTs, the present application firstly constructs a convolutional neural network for training in the training dataset. During training, low-resolution images are amplified to target resolution using the edge direction-based upsampling. The target resolution should be equal to the resolution of the corresponding original high-resolution images. The low-resolution images and corresponding original high-resolution images are input into the one or more convolutional neural networks for training, and the trained convolutional neural network models are obtained. The trained convolutional neural network models are converted into the LUTs, and the LUTs are further downsampled to reduce their size to obtain the final LUTs. It should be noted that the final LUTs can be the LUTs without being downsampled.

Figure 4:
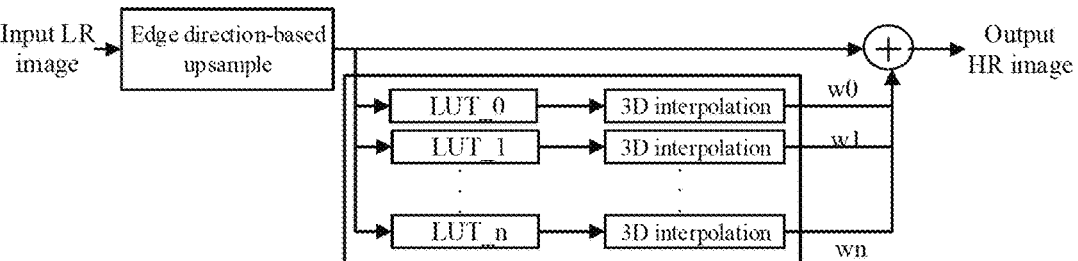
FIG. 4 is a schematic diagram of 3D interpolation of a LUT according to an embodiment of the present application.
Figure 5A:
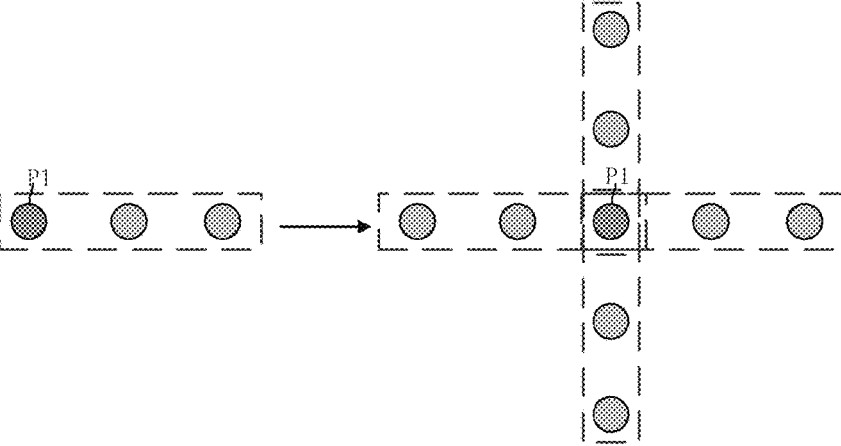
FIG. 5(*a*) is a schematic diagram of a process for selecting input data when the dilation rate is 1 according to an embodiment of the present application.

As shown in FIG. 4, during the implementation of the application, since the LUTs are the results of downsampling, they are necessary to perform 3D upsampling interpolation to obtain the output residual information. Then, multiple output results are weighted and averaged to obtain the final edge residual information. The final super-resolution image is obtained by summing the weighted and averaged results to the image obtained by the edge direction-based upsampling. The 3D interpolation used in FIG. 4 may be performed using any 3D interpolation method, such as trilinear interpolation, etc.

The combination of the edge direction-based upsampling amplification and LUTs ensures that the output high-resolution image retains the feature of fewer jaggies in the output image of the edge direction-based upsampling interpolation, while also greatly improving image definition. This greatly improves the output image quality without increasing too much hardware resources.

Regarding the selection of input data of the LUT, the following is an example of a 3D LUT, and the LUTs of other dimensions can be similar.

Input data for 3D LUT: the input data for a single 3D LUT query calculation requires three pixels. There are multiple choices for these three pixels depending on the method used during training. As shown in FIG. (5$a$): P1 in the figure represents the current pixel, and the input three pixels can be selected to contain the current pixel and the two pixels to its left, which can also be the current pixel and the two pixels to its right (or above, or below). On the other hand, as shown in FIG. (5$b$), these three pixels can also be selected at a certain interval of n, for example, in this figure, input pixels can be selected at an interval of 1.

In general, the selection of intervals also has a certain relationship with the method of training to generate 3D LUTs. The following is an example of using convolutional neural networks to generate 3D LUTs to illustrate the selection of input pixels.

When a convolutional neural network is used to generate a 3D LUT, the selection of these three pixels is related to the dilation rate and the self-ensemble angle of the dilated convolution used by the convolutional neural network corresponding to the 3D LUT, and different dilation rates and different angles may result in different selections.

Taking the dilation rate of 1 as an example to illustrate the selection of input data, as shown in FIG. (5$a$). Under normal circumstances, when the dilation rate is 1, the inputs to the 3D LUT are the current pixel as well as the two pixels to the left (three pixels in total), such as the left horizontal three pixels in FIG. (5$a$), where P1 is the current pixel. Due to the use of self-ensemble technology, the input data corresponding to the four angles at 0°, 90°, 180°, and 270° needs to be put into 3D LUT. As shown in the right side of FIG. (5$a$), the input data for these four angles are two pixels on the left of the current pixel, two pixels below the current pixel, two pixels on the right of the current pixel, and two pixels above the current pixel, which together form four sets of input data corresponding to 0°, 90°, 180°, and 270°, respectively.

Similarly, if the dilation rate is 2, as shown in FIG. (5$b$), it is necessary to select the corresponding three pixel points as 3D LUT inputs starting from the current pixel at 1 pixel interval, in FIG. (5$b$), the current pixel and pixels P2, P3 in 4 directions are selected as 3D LUT inputs.

After selecting the corresponding three pixels, these three pixels need to be processed according to the 3D LUT downsampling interval. For example, when the downsampling interval is 16, these three pixel values are divided by 16, resulting in 3 integer portions of the result labeled (left_c0, cur_c0, right_c0) and fractional portions of the result labeled (left_offset0, cur_offset0, right_offset0). Finally, based on the two sets of data (left_c0, cur_c0, right_c0) and (left_offset0, cur_offset0, right_offset0), as well as the output data of the 3D LUTs, and the output results of the 3D LUT are obtained by using the 3D interpolation method to perform upsampling interpolation calculations. The 3D interpolation upsampling used can be implemented by any 3D interpolation method, such as 3D linear interpolation, tetrahedral interpolation, and so on.

As mentioned above, the LUTs store information related to the current pixel and its surrounding pixels, which is obtained through training. In particular, the following is an example of a convolutional neural network about the generation of LUTs.

(1) Dilated Convolution:

In the convolutional neural network model involved in the present application, the input layer of the network model adopts the dilated convolution. Unlike other methods, the dilation rate of the dilated convolution used in the present application is related to the amplification factor, and the results of convolutional neural networks with different dilation rates of the dilated convolution are weighted and averaged for output.

As mentioned above, the input image of the convolutional neural network is the amplified image based on the edge direction. The spacing between individual pixels in this amplified image is actually only 1/R when inversely mapped to the corresponding low-resolution image, wherein R is the magnification factor. This will result in a decrease in the receptive field of the convolutional neural network. Therefore, in order to increase the receptive field, combined with the magnification factor of image upsampling, the dilated convolution (or atrous convolution) is used in the input layer(s) of the convolutional neural network. For different magnification factors, the dilated convolution also uses different dilation rates.

For example, FIG. 6(a) shows the 3×3 convolution for the normal standard (dilation rate of 1) and FIG. 6(b) shows the 3×3 dilated convolution with dilation rate of 2. From FIGS. 6(a) and 6(b), it can be seen that the receptive field of 3×3 convolution with dilation rate of 1 is 3×3, while the receptive field of 3×3 dilated convolution with dilation rate of 2 is 5×5.

Increasing the receptive field can enable the output image pixels to obtain more global information around the current pixel, thereby reducing jaggies. However, if the receptive field is too large, it can also lead to the loss of some details. Therefore, dilated convolution with different dilation rates is also used for images of the same magnification factor during training. The dilated convolution with different dilation rates can obtain different scale information, and fusing this information can further improve image quality.

The dilation rate calculation formula of the convolutional neural network of the present application is:

$$d = INT(R * a)$$

Wherein, R is the current amplification factor, a is the adjustment coefficient, and INT (.) is a rounded down function.

For example, when the magnification factor is 2, the typical value of a can be ½ or 1, and the dilation rates used for dilated convolution are 1 and 2, respectively. That is to say, when the magnification factor is 2, the combination of two dilated convolutions with dilation rates of 1 and 2 are used.

(2) Self-Ensemble Technology

The self-ensemble technology is used in the training and implementation process. Specifically, it involves rotating the image obtained by upsampled interpolation based on the edge direction at four different angles (0°, 90°, 180°, and 270°) to obtain a set of four images. Then, these images are inputted into the convolutional neural network model or LUTs to obtain corresponding output results. Finally, these output results are averaged to improve the quality of the output image. The self-ensemble technology is currently a widely used method in super-resolution processing technology based on neural networks, and it will not be described in detail here.

It should be noted that the self-ensemble technology used in other methods uses the same convolutional neural network model for different angles, which means that the dilation rate of the convolution remains unchanged. However, the dilated convolutions with different dilation rates are also used in the present application for different angles. At 0° and 180°, more dilated convolutions with different dilation rates can be combined, while at 90° and 270°, relatively fewer dilated convolutions with different dilation rates can be combined. For example, at 2× magnification factor, two types of dilated convolutions with dilation rates of 1 and 2 can be used at 0° and 180°, respectively, while only dilated convolution with dilation rate of 1 can be used at 90° and 270°.

(3) Multiple Neural Network Models

The present application only uses the dilated convolution in the input layer. In order to achieve the dilated convolutions with different dilation rates, the present application adopts different convolutional neural network models, that is, one convolutional neural network model corresponds to one dilation rate. Multiple convolutional neural network models are required to implement the dilated convolutions with different dilation rates.

Figure 7:
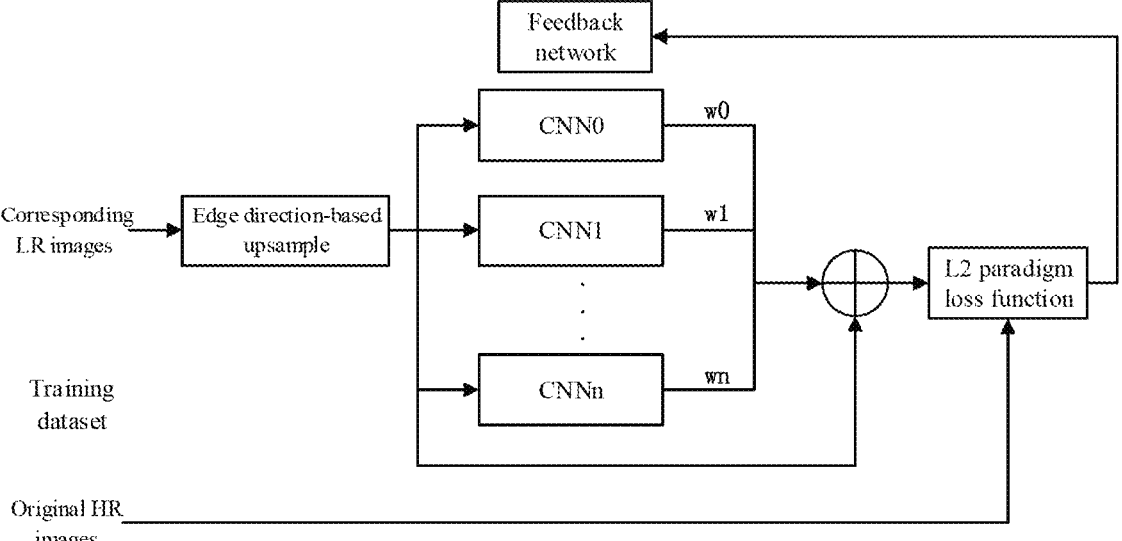
FIG. 7 is a schematic diagram of a neural network with a feedback network according to an embodiment of the present application.

As shown in FIG. 7, the output results of the multiple convolutional neural networks can be weighted and summed to obtain the residual. The super-resolution output is obtained by adding the residual image and the image upsampled based on the edge direction. Finally the residual image and the original high resolution image are used to calculate the mean square error MSE, the error is passed through the backward propagation network and Adam's algorithm is used to optimize and update the weights of each neural network, and so on and so forth, and once certain conditions are met, the network is trained and saved.

(4) Converting the Convolutional Neural Network Models to LUTs

After the convolutional neural networks are trained, the neural network models are converted into LUTs.

The following is an example of a 3D LUT.

For images with input pixels of 8 bits, the size of the complete 3D LUT is 256*256*256. At this point, if the precision is sufficient, then this 3D LUT is basically the same as the neural network model. Taking the data content in the 3D LUT with 8-bit precision as example, the size of this 3D LUT table is 16 GB. If used directly, it requires very large hardware resources, so in order to implement it in hardware, the 3D LUT is downsampled (the downsampling interval is n, typical values of n are 4, 8, 16, 32, etc.). Take the sampling interval of 16 as an example, the size of the downsampled 3D LUT is only 17*17*17, if the data content in the table is 8 bit, then the size of the 3D LUT is about 5 KB, if the content of the 3D LUT is 10 bit, the size of the 3D LUT is 6 KB, so that it can satisfy the requirements of the hardware implementation.

In the application implementation, 3D upsampling is required to restore the 3D LUT, and there is a loss of precision in the process. In order to minimize losses, the data output from the neural network and 3D LUT in this application is the residual component of the image. The range of the residual values is relatively small, so that when downsampling, the quantization loss can be reduced, and the content of the 3D LUT can also be represented by less bit width, which also saves the size of the 3D LUT. The residual component needs to be added to the upsampled image based on the edge direction to obtain the final super-resolution result.

Similarly, if the lookup table is a 4D LUT, a sampling interval of 32 can be used, and the size of the 4D LUT is only 9*9*9*9. If the data content in the 4D LUT is 8 bit, then the 4D LUT is approximately 6 KB. If the content in the table is 10 bit, the 4D LUT is approximately 7 KB, which can meet the hardware implementation requirements.

It should be noted that super-resolution image processing is a sub module of the video image processing module. A typical implementation method is to first perform noise reduction on the input image, such as random noise, pseudo contour noise, and then perform super-resolution image processing. Finally, it is processed in the image enhancement module.

Figure 8:
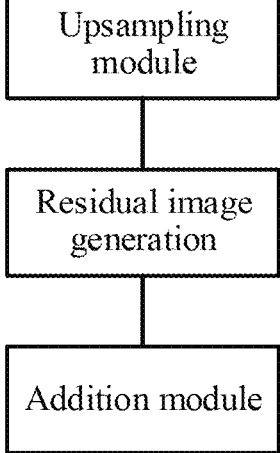
FIG. 8 is a schematic diagram of a single image super-resolution processing system according to a second embodiment of the present application.

The second embodiment of this application relates to a single image super-resolution processing system, as shown in FIG. 8. The single image super-resolution processing system comprises an upsampling module, a residual image generation module, and an addition module. Wherein, the upsampling module is used to perform edge direction-based upsample on an input image to be processed to obtain a target resolution image. The residual image generation module is used to input the target resolution image obtained by upsampling into one or more lookup tables to obtain a residual image, wherein the one or more lookup tables store residual image information. The addition module is used to add the target resolution image obtained by upsampling to the residual image to obtain a super-resolution image.

The first embodiment is a method embodiment corresponding to the present embodiment, and the technical details in the first embodiment can be applied to the present embodiment, and the technical details in the present embodiment can also be applied to the first embodiment.

The single image super-resolution processing method and system of the present application have at least the following beneficial effects:

(1) The present application converts the convolutional neural network models into lookup tables (LUTs) after training is completed. The size of the lookup tables converted by the convolutional neural network models can be reduced to a greater extent by using the edge direction-based super-resolution processing technology to amplify to the target resolution in combination with the convolutional neural networks during training.

(2) During the training process of the convolutional neural networks, the dilated convolutions with different dilation rates are used according to different magnification factors. Firstly, the receptive field is increased, and secondly, different scale information is obtained by using the dilated convolutions with different dilation rates, and the fuse of this information improves image quality.

(3) According to actual needs, one or more convolutional neural network models can be used to improve the adaptability to images with different magnification factors, which correspond to one or more LUTs. This allows for flexible adjustment to the application in order to achieve a balance between output image quality and hardware resources.

It should be noted that those skilled in the art should understand that the implementation functions of each module shown in the embodiment of the single image super-resolution processing system can be understood by referring to the related description of the single image super-resolution processing method. The functions of each module shown in the embodiment of the single image super-resolution processing system can be realized by a program (executable instruction) running on a processor or by a specific logic circuit. If the single image super-resolution processing system in the embodiment of this specification is realized in the form of a software function module and sold or used as an independent product, it can also be stored in a computer readable storage medium. Based on this understanding, the technical solutions of the embodiments of the present disclosure can be embodied in the form of software products in essence or part of contributions to the prior art. The computer software product is stored in a storage medium, and includes several instructions to enable a computer device (which may be a personal computer, server, or network device, etc.) to perform all or part of the methods described in the embodiments of the present disclosure. The foregoing storage media include various media that can store program code, such as a U disk, a mobile hard disk, a read-only memory (ROM, Read Only Memory), a magnetic disk, or an optical disk. In this way, the embodiments of the present disclosure are not limited to any specific combination of hardware and software.

Correspondingly, the embodiments of the present disclosure also provide a computer storage medium in which computer-executable instructions are stored. When the computer-executable instructions are executed by a processor, the method embodiments of the present application are implemented. Computer-readable storage media comprise permanent and non-permanent, removable and non-removable media can be any method or technology to achieve information storage. Information can be computer-readable instructions, data structures, modules of programs, or other data. Examples of a storage medium of a computer include, but are not limited to, Phase Change Memory (PRAM), Static Random Access Memory (SRAM), Dynamic Random Access Memory (DRAM), Other Types of Random Access Memory (RAM), Read Only Memory (ROM), Electrically Erasable Programmable Read Only Memory (EEPROM), Flash Memory or other Memory Technology, Read Only Disc Read Only Memory (CD-ROM), Digital Versatile Disc (DVD) or other optical storage, Magnetic Tape Cassette, Magnetic tape magnetic disk storage or other magnetic storage device or any other non-transmission medium that can be used to store information that can be accessed by a computing device. As defined herein, computer-readable storage media do not include temporary computer-readable media, such as modulated data signals and carrier waves.

It should be noted that in the application documents of the present patent, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In the application file of this patent, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

The serial numbers used in describing the steps of the method do not in themselves constitute any limitation on the order of those steps. For example, it is not necessary that the step with the larger serial number be performed after the step with the smaller serial number, but it is also possible that the step with the larger serial number be performed before the step with the smaller serial number, or that the steps be performed in parallel, as long as this order of performance is reasonable to a person skilled in the art. For example, a plurality of steps with consecutive serial numbers does not limit the number of other steps that may be performed there between.

All documents referred to in this specification are deemed to be incorporated in their entirety in the disclosure of this specification so as to serve as a basis for modifications where necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition the processes described in the drawings do not necessarily require a particular order or successive order shown to achieve the desired results. In some embodiments, multitasking and parallel processing are also possible or may be advantageous.

What is claimed is:

1. A single image super-resolution processing method, comprising:

inputting an image to be processed and performing edge direction-based upsampling on the image to obtain a target resolution image;

inputting the target resolution image obtained by upsampling into one or more lookup tables to obtain a residual image, wherein the one or more lookup tables store residual image information; and adding the target resolution image obtained by the upsampling to the residual image to obtain a super-resolution image.

2. The method according to claim 1, wherein the one or more lookup tables are obtained by using a training process.

3. The method according to claim 2, wherein the training process comprises a training process that combines a convolutional neural network with an edge direction-based upsampling method.

4. The method according to claim 3, wherein using the training process that combines the convolutional neural network with the edge direction-based upsampling method to obtain the one or more lookup tables, comprises:

applying the edge direction-based upsampling to low-resolution training images in a training dataset to obtain target resolution training images;

inputting original high-resolution training images corresponding to the low-resolution training images in the training dataset and the target resolution training images obtained by upsampling into one or more convolutional neural network models for training, wherein the resolution of the original high-resolution training images is the same as that of the target resolution training images obtained by upsampling; and converting the trained one or more convolutional neural network models into corresponding one or more lookup tables.

5. The method according to claim 4, wherein input layer(s) of the one or more convolutional neural network models uses dilated convolution, the method further comprises:

determining an amplification factor of the edge direction-based upsampling to obtain the target resolution training images, and determining a dilation rate of the dilated convolution based on the amplification factor;

training with one or more convolutional neural network models with different dilation rates of the dilated convolution; and weighting training results of the one or more convolutional neural network models with different dilation rates of the dilated convolution.

6. The method according to claim 5, wherein the dilation rate of the dilated convolution is calculated according to the following formula: $d=INT (R*a)$, wherein d is the dilation rate of the dilated convolution, R is the magnification factor, a is an adjustment coefficient, and INT (.) is a rounded down function.

7. The method according to claim 5, wherein after weighting the training results of the one or more convolutional neural network models with different dilation rates of the dilated convolution, the method further comprises:

weighting and summing the training results of the one or more convolutional neural network models with different dilation rates of the dilated convolution to obtain residual training images, adding the residual training images to the target resolution training images obtained by edge direction-based upsampling to obtain super-resolution training images;

calculating a mean square error between the super-resolution training images and the original high-resolution training images; and passing the mean square error through a backward propagation network, and optimizing and updating weights of the one or more convolutional neural network models by using a preset algorithm.

8. The method according to claim 5, wherein for a lookup table generated by training a convolutional neural network model using a dilated convolution with a dilation rate of 1, selecting n pixels at an interval of 0 from the target resolution image obtained by the upsampling as input data put into the lookup table, and for a lookup table generated by training a convolutional neural network model using a dilated convolution with a dilation rate of 2, selecting n pixels at an interval of 1 from the target resolution image obtained by the upsampling as input data put into the lookup table.

9. The method according to claim 4, further comprising:

obtaining a set of training images by rotating the target resolution training image obtained by upsampling at different angles; and training on the set of training images obtained by rotating at different angles by employing one or more convolutional neural network models of dilated convolution with different dilation rate combinations.

10. The method according to claim 9, wherein the different angles of rotation include 0°, 90°, 180°, and 270°, wherein the training images obtained from 0° and 180° rotations are trained by employing one or more convolutional neural network models with more dilation rate combinations than the training images obtained from 90° and 270° rotations.

11. The method according to claim 9, wherein for a lookup table generated by performing convolutional neural network model training on the training images obtained by rotating at different angles, selecting n pixels at corresponding rotation angle form the target resolution image obtained by the upsampling as input data put into the lookup table.

12. The method according to claim 4, further comprising:

during the process of converting the trained one or more convolutional neural network models into one or more lookup tables, downsampling the converted one or more lookup tables to reduce the size of the lookup tables.

13. The method according to claim 12, wherein the step of inputting the target resolution image obtained by the upsampling into one or more lookup tables to obtain a residual image, comprises:

during the process of inputting the target resolution image obtained by upsampling into one or more lookup tables to obtain the residual image, performing upsampling interpolation on the one or more lookup tables.

14. The method according to claim 13, wherein an interval of the downsampling is 8, 16 or 32.

15. The method according to claim 14, wherein the interpolation includes 3D linear interpolation, tetrahedral interpolation.

16. A single image super-resolution processing system, comprising:

an upsampling module configured to perform edge direction-based upsample on an input image to be processed to obtain a target resolution image;

a residual image generation module configured to input the target resolution image obtained by upsampling into one or more lookup tables to obtain a residual image, wherein the one or more lookup tables hold residual image information; and an addition module configured to add the target resolution image obtained by upsampling to the residual image to obtain a super-resolution image.

17. A computer-readable storage medium, wherein the computer-readable storage medium stores computer executable commands which are executed by a processor to implement the following steps:

inputting an image to be processed and performing edge direction-based upsampling on the image to obtain a target resolution image;

inputting the target resolution image obtained by upsampling into one or more lookup tables to obtain a residual image, wherein the one or more lookup tables store residual image information; and adding the target resolution image obtained by the upsampling to the residual image to obtain a super-resolution image.

\* \* \* \* \*